US010029857B2

(12) United States Patent
Toshikiyo et al.

(10) Patent No.: US 10,029,857 B2
(45) Date of Patent: Jul. 24, 2018

(54) PACKAGE LOADING INSTRUCTION METHOD AND LOADING INSTRUCTION SYSTEM

(71) Applicant: Panasonic Intellectual Property Management Co., Ltd., Osaka (JP)

(72) Inventors: Kimiaki Toshikiyo, Osaka (JP); Daisuke Nishimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/311,864

(22) PCT Filed: Jul. 16, 2015

(86) PCT No.: PCT/JP2015/003595
§ 371 (c)(1),
(2) Date: Nov. 17, 2016

(87) PCT Pub. No.: WO2016/021124
PCT Pub. Date: Feb. 11, 2016

(65) Prior Publication Data
US 2017/0267461 A1    Sep. 21, 2017

Related U.S. Application Data

(60) Provisional application No. 62/032,963, filed on Aug. 4, 2014.

(51) Int. Cl.
B65G 43/08    (2006.01)
B65G 57/03    (2006.01)
(Continued)

(52) U.S. Cl.
CPC ............. *B65G 43/08* (2013.01); *B65G 57/03* (2013.01); *G01B 11/24* (2013.01); *G01S 17/08* (2013.01)

(58) Field of Classification Search
USPC ....................................................... 700/217
See application file for complete search history.

(56) References Cited

U.S. PATENT DOCUMENTS

2010/0131235 A1* 5/2010 Aoba ................. G01B 11/2518
702/153
2010/0222915 A1* 9/2010 Kuehnemann ......... B65G 57/00
700/217
2015/0130592 A1* 5/2015 Lakshminarayanan ....................
G06K 7/10297
340/10.1

FOREIGN PATENT DOCUMENTS

JP    4-327422    11/1992
JP    6-137822    5/1994
(Continued)

OTHER PUBLICATIONS

International Search Report of PCT application No. PCT/JP2015/003595 dated Oct. 20, 2015.

Primary Examiner — Kyle O Logan
(74) Attorney, Agent, or Firm — McDermott Will & Emery LLP

(57) ABSTRACT

An arrangement of loaded packages is estimated three-dimensionally. A loading position at which a target package is loaded next is determined based on the estimated arrangement. A position at which the target package is loaded is instructed by irradiation with an index light indicating the determined loading position. This method allows a package to be loaded in a limited space, for example, the package to be loaded optimally in a transport device or in a storehouse.

11 Claims, 2 Drawing Sheets

(51) Int. Cl.
*G01B 11/24* (2006.01)
*G01S 17/08* (2006.01)

(56) References Cited

FOREIGN PATENT DOCUMENTS

| | | |
|---|---|---|
| JP | 7-120238 | 5/1995 |
| JP | 7-242309 | 9/1995 |
| JP | 2012-220479 | 11/2012 |

* cited by examiner

PACKAGE LOADING INSTRUCTION METHOD AND LOADING INSTRUCTION SYSTEM

This application is a U.S. national stage application of the PCT international application No.PCT/JP2015/003595 filed on Jul. 16, 2015 the benefit of priority of a U.S. provisional application No. 62/032,963 filed on Aug. 4, 2014, the contents all of which are incorporated herein by reference.

TECHNICAL FIELD

The present invention relates to a package loading instruction method and a loading instruction system such as loading of a package in a transport means, for example a truck or loading of a package in a storehouse.

BACKGROUND ART

Recently, sales of merchandise by a so-called e-commerce in which a user orders merchandise over the Internet and then a trader who has received the order delivers the merchandise to a specified receiving location, such as the user's home or the home nearby convenience store, are gradually activated.

It is important to load merchandise by laying the merchandise without leaving a useless space in a cargo space of the transport means, for example a truck, such that the trader received the order delivers the merchandise to as many users as possible in a short period of time.

In a case where the trader stores the merchandise in the storehouse until the trader receives an order, it is important to load the merchandise by laying the merchandise without leaving a useless space in the storehouse in the same manner as described above, such that the trader stores as much the merchandises as possible in one storehouse.

A technique relating to the above loading is disclosed in PTL 1.

CITATION LIST

Patent Literature

PTL 1: Japanese Patent Laid-Open Publication No. 4-327422

SUMMARY

An arrangement of loaded packages is estimated three-dimensionally. A loading position at which a target package is loaded next is determined based on the estimated arrangement. A position at which the target package is loaded is instructed by irradiation with an index light indicating the determined loading position.

This method allows a package to be loaded in a limited space, for example, the package to be loaded optimally in a transport device or in a storehouse.

DETAIL DESCRIPTION OF PREFERRED EMBODIMENTS

Figure 1:
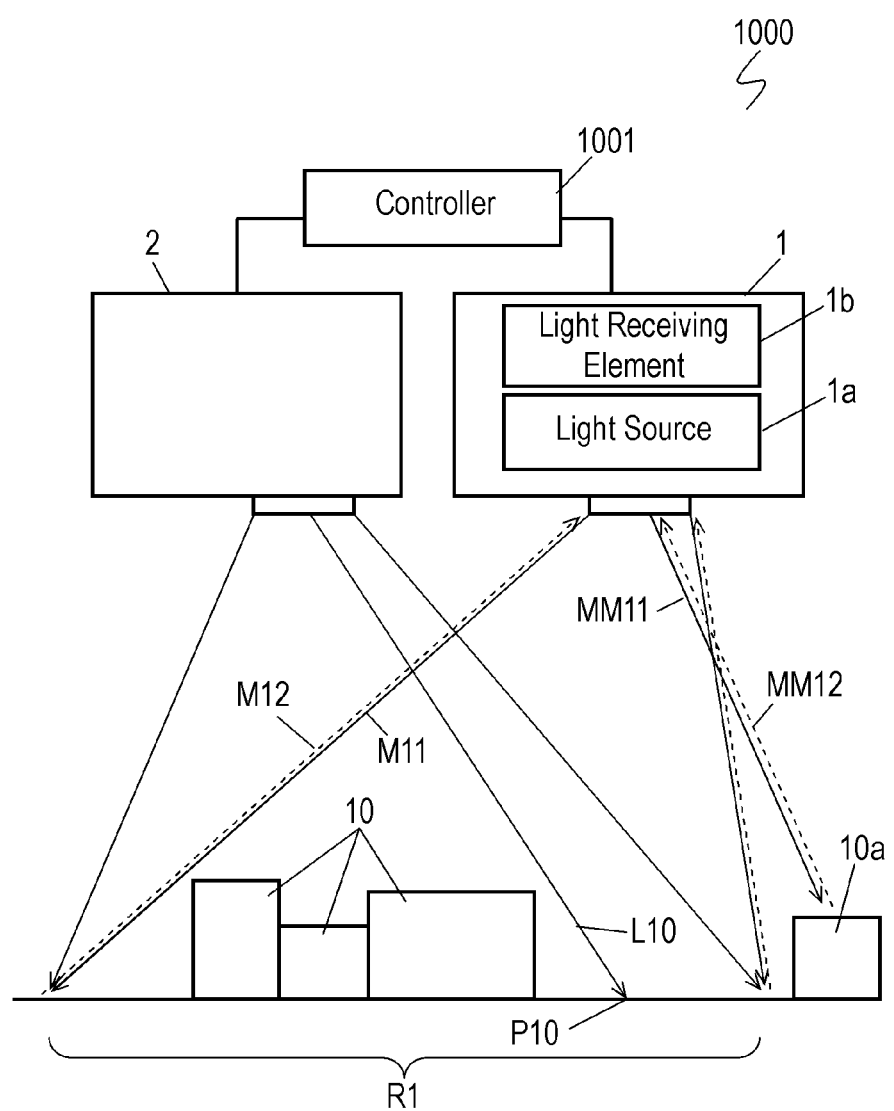
FIG. 1 is an overall schematic diagram of a loading instruction system according to Exemplary Embodiment 1.

Exemplary Embodiment 1
FIG. 1 is an overall schematic diagram of loading instruction system 1000 according to Exemplary Embodiment 1. Loading instruction system 1000 performs a first package loading instruction method. According to Embodiment 1, "loading" refers to placing articles, such as a package, in a predetermined section while, e.g. allowing the articles to overlap each other and disposing the articles adjacent to each other.

Loading instruction system 1000 includes arrangement estimation device 1 and irradiation device 2. FIG. 1 illustrates packages 10 loaded in loading section R1 and arrows indicating a light and a direction of the light.

In loading instruction system 1000 according to Embodiment 1, a Time of Flight (ToF) sensing camera is used as arrangement estimation device 1. The ToF sensing camera includes light source 1a and light receiving element 1b. Light source 1a emits measurement light M11.

The ToF sensing camera measures a time point when a target object (a package) is irradiated with measurement light M11 and a time point when reflection light M12 from the target object generated by measurement light M11 being reflected from the target object is received with light receiving element 1b, and then, calculates a distance from light receiving element 1b to the target object based on the time difference between the time points. Light receiving element 1b includes pixels each of which can receive reflection light M12. The ToF sensing camera can obtain a distance image including pixels each having a distance between light receiving element 1b and a portion of the target object corresponding to respective one of the pixels as a value based on the time difference measured at the respective one of the pixels. The ToF sensing camera can estimate a three-dimensional shape and a dimension of the target object by obtaining a two-dimensional captured image by normally capturing the target object and acquiring the distance image.

Irradiation device 2 is implemented by a projector. The projector may preferably have a projection angle enough to irradiate the entire section at which packages 10 are placed.

A package loading instruction method using loading instruction system 1000 will be detailed with reference to FIG. 1. In FIG. 1, packages 10 are loaded in loading section R1 in which a package is to be loaded.

The first package loading instruction method includes five processes: an irradiation process; a light receiving process; an arrangement estimation process; a loading position determination process; and a loading position instruction process.

In the irradiation process, first, the ToF sensing camera, light source 1a of arrangement estimation device 1 irradiates packages 10 with measurement light M11. According to Embodiment 1, measurement light M11 is near-infrared light which is invisible light.

Next, in the light receiving process, light receiving element 1b of arrangement estimation device 1 receives reflection light M12 generated by measurement light M11 with which packages 10 are irradiated in the irradiation process being reflected from packages 10.

Next, in the arrangement estimation process, three-dimensional shape of packages 10, that is, the arrangement of packages 10 is estimated based on the distance image and the captured image of packages 10 based on the method described above with reflection light M12.

Next, in the loading position determination process, controller 1001 determines the optimal loading position of target package 10a based on the data indicating the arrangement of packages 10 estimated in the arrangement estimation process and the three-dimensional shape of target package 10a to be loaded next. Controller 1001 may be a device separated from arrangement estimation device 1 and irradiation device 2 or may be incorporated in one of arrangement estimation device 1 and irradiation device 2. The three-dimensional shape data indicating the three-dimensional shape of target package 10a is acquired by controller 1001 before controller 1001 determines the optimal loading position. The three-dimensional shape data can be obtained by imaging a three-dimensional shape of target package 10a with, e.g. the ToF camera similarly to arrangement estimation device 1. In other words, arrangement estimation device 1 receives reflection light MM12 reflected from target package 10a after target package 10a is irradiated with measurement light MM11. Controller 1001 estimates the three-dimensional shape of target package 10a based on reflection light MM12. Alternatively, the reflection light of the slit light to be used in the second package loading instruction method to be described below is received by a high-speed camera to obtain the three-dimensional shape data of target package 10a.

Next, in the loading position instruction process, irradiation device 2 emits index light L10 indicating optimal loading position P10 of target package 10a determined by controller 1001 in the loading position determination process. Irradiation device 2 can irradiate the entirety of loading section R1 for loading target package 10a. Irradiation device 2 projects index light L10 only to loading position P10 in the irradiating range.

An operator loads target package 10a in loading position P10 instructed in the loading position instruction process. The arrangement of packages 10 and 10a loaded in predetermined loading section R1 becomes optimal by repeating these four processes, and as a lot of packages 10 and 10a can be loaded in predetermined loading section R1.

In the loading instruction method in the related art described above, loading in the package space of the transport device of the merchandise or loading in the storehouse is basically performed based on a subjective judgment of the operator. However, the merchandise has wide variety of shapes, it is very difficult to load merchandise in the cargo space or the storehouse without leaving a useless space. Therefore, the merchandise may not be loaded optimally in the cargo space or in the storehouse.

In the loading instruction method according to Embodiment 1, packages 10 and 10a are loaded optimally in the limited space, such as the transport device and the storehouse.

Exemplary Embodiment 2

Figure 2:
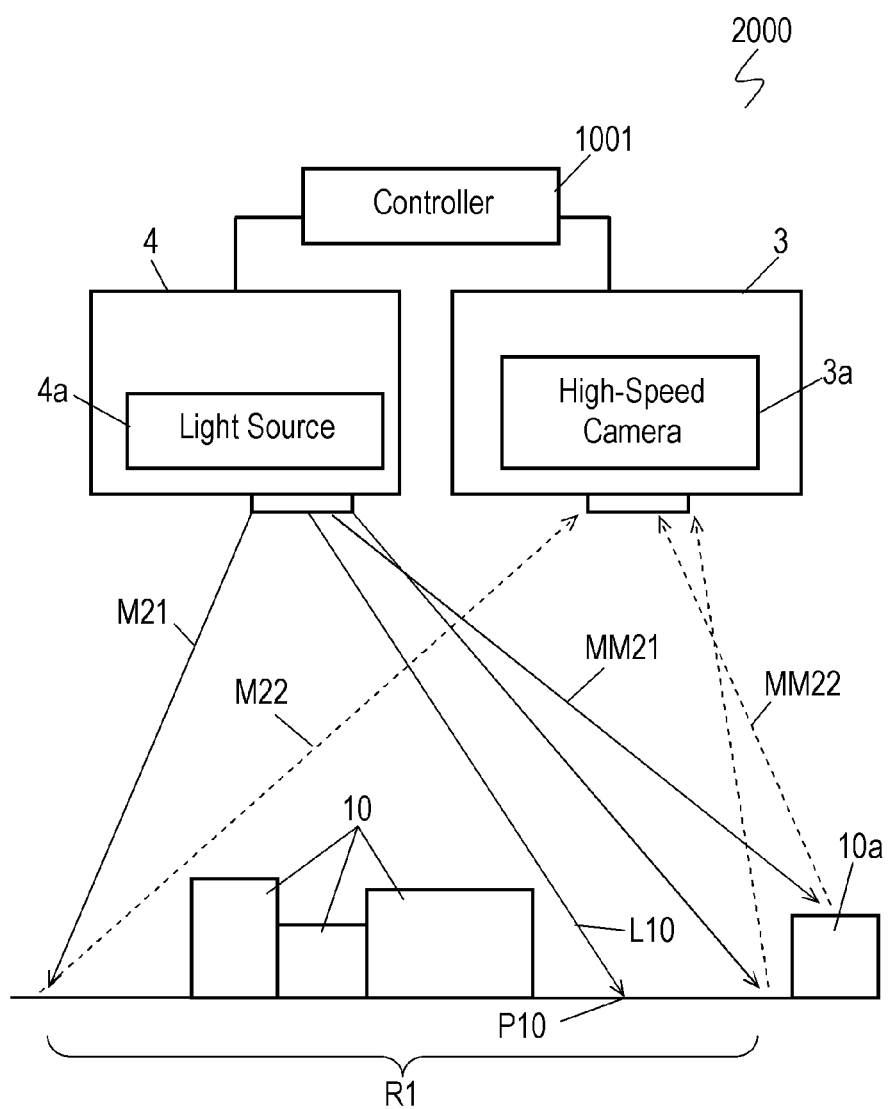
FIG. 2 is an overall schematic diagram of a loading instruction system according to Exemplary Embodiment 2.

FIG. 2 is an overall schematic diagram of loading instruction system 2000 according to Exemplary Embodiment 2. Loading instruction system 2000 performs the second package loading instruction method. The second package loading instruction method according to Embodiment 2 is different from the first package loading instruction method according to Embodiment 1 in the method of estimating the arrangement of packages 10 loaded in loading section R1 in which a package is to be loaded.

As illustrated in FIG. 2, loading instruction system 2000 used in the second package loading instruction method includes arrangement estimation device 3 and irradiation device 4, instead of arrangement estimation device 1 and irradiation device 2 of loading instruction system 1000 according to Embodiment 1. In FIG. 2, packages 10 loaded in loading section R1 are also illustrated, and arrow indicates light and a direction of the light. Controller 1001 may be a device separated from arrangement estimation device 3 and irradiation device 4 or may be incorporated in one of arrangement estimation device 3 and irradiation device 4.

Arrangement estimation device 3 includes high-speed camera 3a incorporated therein. A projector is used as irradiation device 4. The device includes light source 4a.

The second package loading instruction method includes five processes: an irradiation process; a light receiving process; an arrangement estimation process; a loading position determination process; and a loading position instruction process, similarly to the first package loading instruction method.

In the irradiation process, first, irradiation device 4 irradiates the entirety of packages 10 loaded in loading section R1 in which a package is to be loaded with measurement light M21 several times. According to Embodiment 2, measurement light M21 is laser slit light.

Next, in the light receiving process, arrangement estimation device 3 receives reflection light M22 generated by measurement light M21 emitted in the irradiation process being reflected from packages 10. In accordance with Embodiment 2, high-speed camera 3a of arrangement estimation device 3 receives a pattern of reflection light M22 of measurement light M21 which is laser slit light.

Next, in the arrangement estimation process, the three-dimensional shape of packages 10 based on the pattern of reflection light M22, that is, the arrangement of packages 10 is estimated.

Next, in the loading position determination process, controller 1001 determines optimal loading position P10 of target package 10a based on the three-dimensional shape data indicating the arrangement of packages 10 estimated in the arrangement estimation process and the three-dimensional shape of target package 10a to be loaded next. Loading position P10 in the loading position determination process is determined by a method similar to the first package loading instruction method. The three-dimensional shape data of target package 10a can be obtained by the following method. The three-dimensional shape of target package 10a is obtained based on reflection light MM22 reflected after light source 4a of irradiation device 4 irradiates the target package 10a with measurement light MM21, and thus the three-dimensional shape data indicating the three-dimensional shape can be obtained.

Next, in the loading position instruction process, irradiation device 4 emits index light L10 indicating optimal loading position P10 of target package 10a determined by controller 1001 in the loading position determination process. In other words, in the second package loading instruction method, irradiation device 4 emits measurement light M21 which is laser slit light described above and index light L10 indicating optimal loading position P10. Light source 1a according to Embodiment 1 which is different from irradiation device 4 is not required for arrangement estimation device 3 by the configuration, thus simplifying arrangement estimation device 3. The influence of multi-path that occurs in the package space can be reduced by using the laser slit light as measurement light M21 from irradiation device 4.

Irradiation device 4 can irradiate the entirety of loading section R1 similarly to the first package loading instruction method. Irradiation device 2 projects index light L10 indicating loading position P10 only to loading position P10 in the irradiating range.

In the second package loading instruction method, loading instruction system 2000 can instruct optimal loading position P10 of target package 10a to an operator.

As described above, in the package loading instruction method according to the present invention, as described above, optimal loading position P10 can be instructed to the operator, and as a lot of packages 10 and 10a can be loaded in predetermined loading section R1.

In the above description, in the first package loading instruction method and the second package loading instruction method, the ToF sensing camera or the laser slit light is used. However, in addition to the ToF sensing camera or the laser slit light, a two-dimensional image sensing system, such as a stereo camera may be used. Even using the two-dimensional image sensing system, the arrangement of packages 10 can be estimated, thus providing the same effect.

In the package loading instruction method according to Embodiments 1 and 2, a lot of packages 10 and 10a can be loaded in predetermined loading section R1, and the loading of a package in the package space or the storehouse can be performed without leaving a useless space.

INDUSTRIAL APPLICABILITY

In a package loading instruction method according to the present invention, a lot of packages can be loaded in predetermined loading section and the loading of a package in the package space or the storehouse can be performed without leaving a useless space.

REFERENCE MARKS IN THE DRAWINGS 1 arrangement estimation device
1a light source
1b light receiving element
2 irradiation device
3 arrangement estimation device
3a high-speed camera
4 irradiation device
4a light source
10 package
10a target package
M11, M21 measurement light (first measurement light)
M12, M22 reflection light (first reflection light)
MM11, MM21 measurement light (second measurement light)
MM12, MM22 reflection light (second reflection light)
L10 index light
1000, 2000 loading instruction system

The invention claimed is:

1. A method of instructing a loading of a package, comprising:
providing a single light source and a single light receiving element;
estimating an arrangement of a plurality of loaded packages three-dimensionally;
determining, based on the estimated arrangement, a loading position at which a target package is loaded next;
instructing a position at which the target package is loaded by irradiation with an index light indicating the determined loading position;
causing the single light source to irradiate the plurality of loaded packages with a first measurement light;
causing the single light receiving element to receive a first reflection light which is generated by the first measurement light being reflected from the plurality of packages;
causing the single light source to irradiate the target package with a second measurement light;
causing the single light receiving element to receive a second reflection light generated by irradiating the target package with the second measurement light being reflected from the target package; and
estimating the three-dimensional shape of the target package based on the second reflection light,
wherein said estimating the arrangement comprises estimating the arrangement of the plurality of packages three-dimensionally based on the first reflection light,
wherein said determining the loading position comprises determining the loading position based on the estimated arrangement and a three-dimensional shape of the target package, and
wherein said determining the loading position based on the estimated arrangement and the three-dimensional shape of the target package comprises determining the loading position based on the estimated arrangement and the estimated three-dimensional shape of the target.

2. The method of claim 1,
wherein said receiving the first reflection light comprises receiving the first reflection light with a light receiving element, and
wherein said estimating the arrangement based on the first reflection light comprises estimating the arrangement three-dimensionally by calculating a distance between the light receiving element and each of the plurality of packages based on a time difference between a time point when the first measurement light is irradiated and a time point when the first reflection light is received with the light receiving element.

3. The method of claim 1,
wherein the first measurement light is a laser slit light, and
wherein said receiving the first reflection light comprises imaging the first reflection light with a high-speed camera.

4. The method of claim 1, wherein said instructing the position at which the target package is loaded by irradiation with the index light indicating the determined loading position comprises instructing the position at which the target package is loaded by causing the single light source to irradiate the index light indicating the determined loading position.

5. The method of claim 1, wherein said estimating the arrangement of the plurality of loaded packages three-dimensionally comprises estimating the arrangement of the plurality of loaded packages three-dimensionally using a two-dimensional distance image of the plurality of loaded packages.

6. A loading instruction system comprising:
an arrangement estimation device that estimates an arrangement of a plurality of loaded packages three-dimensionally;
a controller that determines, based on the estimated arrangement, a loading position at which a target package is loaded next;
an irradiation device that instructs a position at which the target package is loaded by irradiation with an index light indicating the determined loading position;
a single light source; and
a single light receiving element,
wherein the single light source is configured to irradiate the plurality of loaded packages with a first measurement light,
wherein the single light receiving element is configured to receive a first reflection light generated by the first measurement light being reflected from the plurality of packages,
wherein the single light source is configured to irradiate the target package with a second measurement light, wherein the single light receiving element is configured to receive a second reflection light generated by the second measurement light being reflected from the target package, wherein the arrangement estimation device is configured to:
  three-dimensionally estimate the arrangement of the plurality of packages based on the first reflection light; and
  estimate the three-dimensional shape of the target package based on the second reflection light, and wherein the controller is configured to determine the loading position based on the estimated arrangement and the estimated three-dimensional shape of the target package.

7. The loading instruction system of claim 6,
wherein the arrangement estimation device is configured to estimate the arrangement three-dimensionally by calculating a distance between the light receiving element and each of the plurality of packages based on a time difference between a time point when the first measurement light is irradiated and a time point when the first reflection light is received with by the light receiving element.

8. The loading instruction system of claim 6,
wherein the first measurement light is laser slit light, and
wherein the arrangement estimation device includes a high-speed camera that images the first reflection light.

9. The loading instruction system of claim 6, wherein the controller is configured to determine the loading position based on the estimated arrangement and a three-dimensional shape of the target package.

10. The loading instruction system of claim 6, wherein the single light source is configured to irradiate an index light indicating the determined loading position.

11. The loading instruction system of claim 6, wherein the arrangement estimation device estimates the arrangement of the plurality of loaded packages three-dimensionally using a two-dimensional distance image of the plurality of loaded packages.

* * * * *